US012175456B2

(12) United States Patent
Yao (10) Patent No.: US 12,175,456 B2
(45) Date of Patent: Dec. 24, 2024

(54) CARBON COIN TRADING SYSTEM AND METHOD THEREOF

(71) Applicant: Li-Ho Yao, Taipei (TW)

(72) Inventor: Li-Ho Yao, Taipei (TW)

( * ) Notice: Subject to any disclaimer, the term of this patent is extended or adjusted under 35 U.S.C. 154(b) by 290 days.

(21) Appl. No.: 17/744,747

(22) Filed: May 16, 2022

(65) Prior Publication Data

US 2022/0366404 A1    Nov. 17, 2022

(30) Foreign Application Priority Data

May 17, 2021    (TW) ................................. 110117789

(51) Int. Cl.
*G06Q 40/04*    (2012.01)
*G06Q 20/36*    (2012.01)

(52) U.S. Cl.
CPC ......... *G06Q 20/3678* (2013.01); *G06Q 40/04* (2013.01)

(58) Field of Classification Search
None
See application file for complete search history.

(56) References Cited

U.S. PATENT DOCUMENTS

| 2022/0292621 A1* | 9/2022 | Tian ....................... G06Q 40/04 |
| 2022/0343229 A1* | 10/2022 | Gruber ................ G06Q 10/063 |
| 2023/0252382 A1* | 8/2023 | Simpson ................ G06Q 50/02 |
| | | 701/410 |
| 2023/0274244 A1* | 8/2023 | Quigley ................ G06F 21/602 |
| | | 705/65 |
| 2023/0306441 A1* | 9/2023 | Crumb ............... G06Q 30/0609 |
| 2023/0385821 A1* | 11/2023 | Sullivan ................ G06Q 40/04 |

* cited by examiner

*Primary Examiner* — Narayanswamy Subramanian
(74) *Attorney, Agent, or Firm* — Leong C. Lei (57) ABSTRACT

Disclosed are a carbon coin trading system and a method thereof. The system includes at least one authentication device connected to a piece of equipment, at least one physical carbon coin, and a trading management host device. The authentication device includes a detection module that detects energy consumption data of the equipment, so that a carbon computation module of the physical carbon coin calculates, according to the energy consumption data, a first carbon emission that is uploaded to the trading management host device. The trading management host device acquires, by means of a declaration calculation module, a declaration of alternatives, so that the declaration calculation module calculates, according to the declaration of alternatives, a second carbon emission and further determined, through calculation, a valuable digital token to be granted and also, a carbon coin trading event is generated and recorded.

5 Claims, 7 Drawing Sheets

FIG.4 a physical carbon coin receiving energy consumption, traveling distance, and GPS coordinate data of a vehicle transmitted from an authentication device, and calculating a first carbon emission discharged from the vehicle

↓ the physical carbon coin uploading, by means of a communication unit, the first carbon emission discharged from the vehicle, the traveling distance, and the GPS coordinate data to a trading management host device

↓ the trading management host device conducting calculation, based on carbon emission parameters, in response to a declaration from a trader for other transportation to achieve same goal, to determine a second carbon emission corresponding thereto

↓ the trading management host device calculating a difference between the two carbon emissions, which is multiplied by a bonus coefficient to serve as a newly added value of a valuable digital token

↓ the trading management host device adding the newly added value of the valuable digital token into a personal account of the trader and also making transmission to the physical carbon coin

↓ the physical carbon coin receiving the newly added value of the valuable digital token and updating the value of the valuable digital token stored in a memory unit

```
┌─────────────────────────────────────────┐
│ a physical carbon coin receiving energy consumption of │
│ equipment transmitted from an authentication device, and │
│ calculating a first carbon emission discharged from the │
│                  equipment               │
└─────────────────────────────────────────┘
                    │
                    ▼
┌─────────────────────────────────────────┐
│ the physical carbon coin uploading, by means of a │
│ communication unit, the first carbon emission discharged │
│ from the equipment to a trading management host device │
└─────────────────────────────────────────┘
                    │
                    ▼
┌─────────────────────────────────────────┐
│ the trading management host device conducting calculation, │
│ based on carbon emission parameters, in response to a │
│ declaration from a trader for other tools to achieve same │
│ goal, to determine a second carbon emission corresponding │
│                   thereto                │
└─────────────────────────────────────────┘
                    │
                    ▼
┌─────────────────────────────────────────┐
│ the trading management host device calculating a │
│ difference between the two carbon emissions, which is │
│ multiplied by a bonus coefficient to serve as a newly added │
│       value of a valuable digital token   │
└─────────────────────────────────────────┘
                    │
                    ▼
┌─────────────────────────────────────────┐
│ the trading management host device adding the newly │
│ added value of the valuable digital token into a personal │
│ account of the trader and also making transmission to the │
│            physical carbon coin          │
└─────────────────────────────────────────┘
                    │
                    ▼
┌─────────────────────────────────────────┐
│ the physical carbon coin receiving the newly added value │
│ of the valuable digital token and updating the value of the │
│ valuable digital token stored in a memory unit │
└─────────────────────────────────────────┘
```

FIG. 7

CARBON COIN TRADING SYSTEM AND METHOD THEREOF

TECHNICAL FIELD OF THE INVENTION

The present invention relates generally to the technical field of carbon trading, and more particularly to a carbon coin trading system and a method thereof, which enable real-time calculation of carbon emission to allow small entities to retrieve the benefit of carbon reduction and participate in carbon reduction for efficiently and effectively alleviating the greenhouse effect.

DESCRIPTION OF THE PRIOR ART

To achieve the purpose of reduce emissions of greenhouse gases, incentive measures are the generally adopted strategy. Purchase/sale of emission allowances (also referred to as carbon credit) is conducted with carbon trading, so that the total carbon emission can be effectively controlled by means of the market mechanism.

However, all the trading schemes are basically trading conducted between large-sized businesses or states. On the contrary, no carbon credit trading systems have been effectively established for medium-size or small-size businesses, or individuals, (which will be collectively referred to as "small entities" hereinafter), who generate a majority of carbon emission, because such carbon emissions are not in an economic scale. This affects people's intention for carbon reduction.

In other words, if the small entities may act for effective trading of carbon credit, the situation that carbon credit trading was considered a tool for monopoly and wealth gathering by a few large-sized businesses can be changed, allowing the small entities to retrieve benefit of carbon reduction and to participate in carbon reduction and, so that the greenhouse effect can be alleviated more efficiently and more effectively. Thus, it is an important issue today to develop a carbon reduction profiting scheme for the small entities so as to allow carbon reduction profiting to be conducted in a systematic way under a condition of being real time and for the small entities. This is what the invention attempts to probe into.

SUMMARY OF THE INVENTION

Thus, the primary objective of the present invention is to make it possible for the small entities to profit from carbon reduction in order to encourage the small entities to participate in carbon reduction and retrieve the benefit of carbon reduction for creating their economic value thereof.

Another objective of the present invention is to provide incentives to the small entities in order to achieve the goal of efficiently and effectively reducing emission of greenhouse gases and to effective control the total carbon emission by means of operation of market mechanisms.

A further objective of the present invention is to realize instantaneous computation of carbon emission quantity, so that general small entities may timely conduct trading of carbon coins to thereby allow the small entities to enjoy the benefit of carbon reduction and to willingly and aggressively act for carbon reduction.

DETAILED DESCRIPTION OF THE PREFERRED EMBODIMENT

Figure 1:
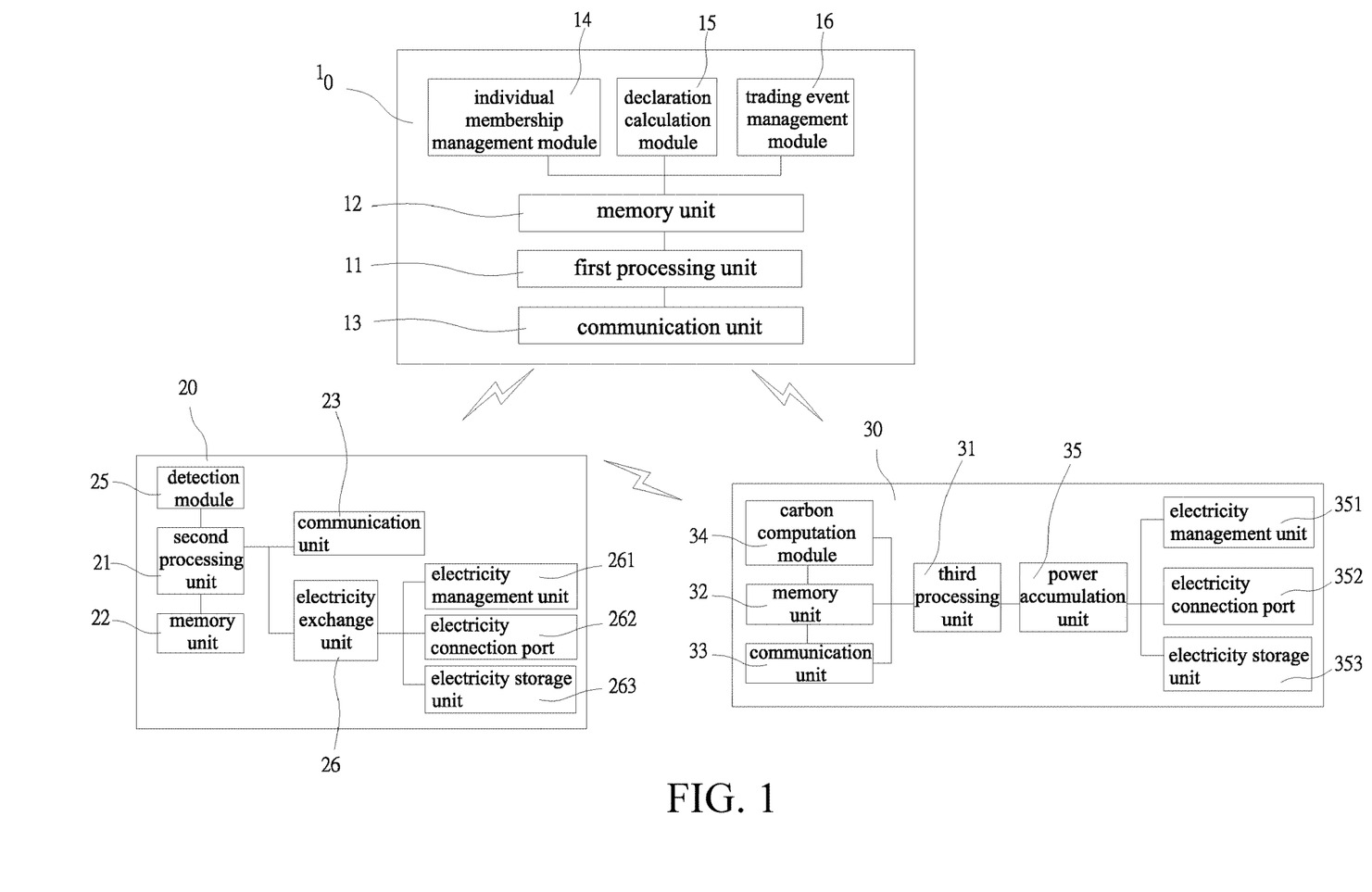
FIG. 1 is a schematic view showing architecture of a carbon coin trading system according to the present invention.
Figure 2:
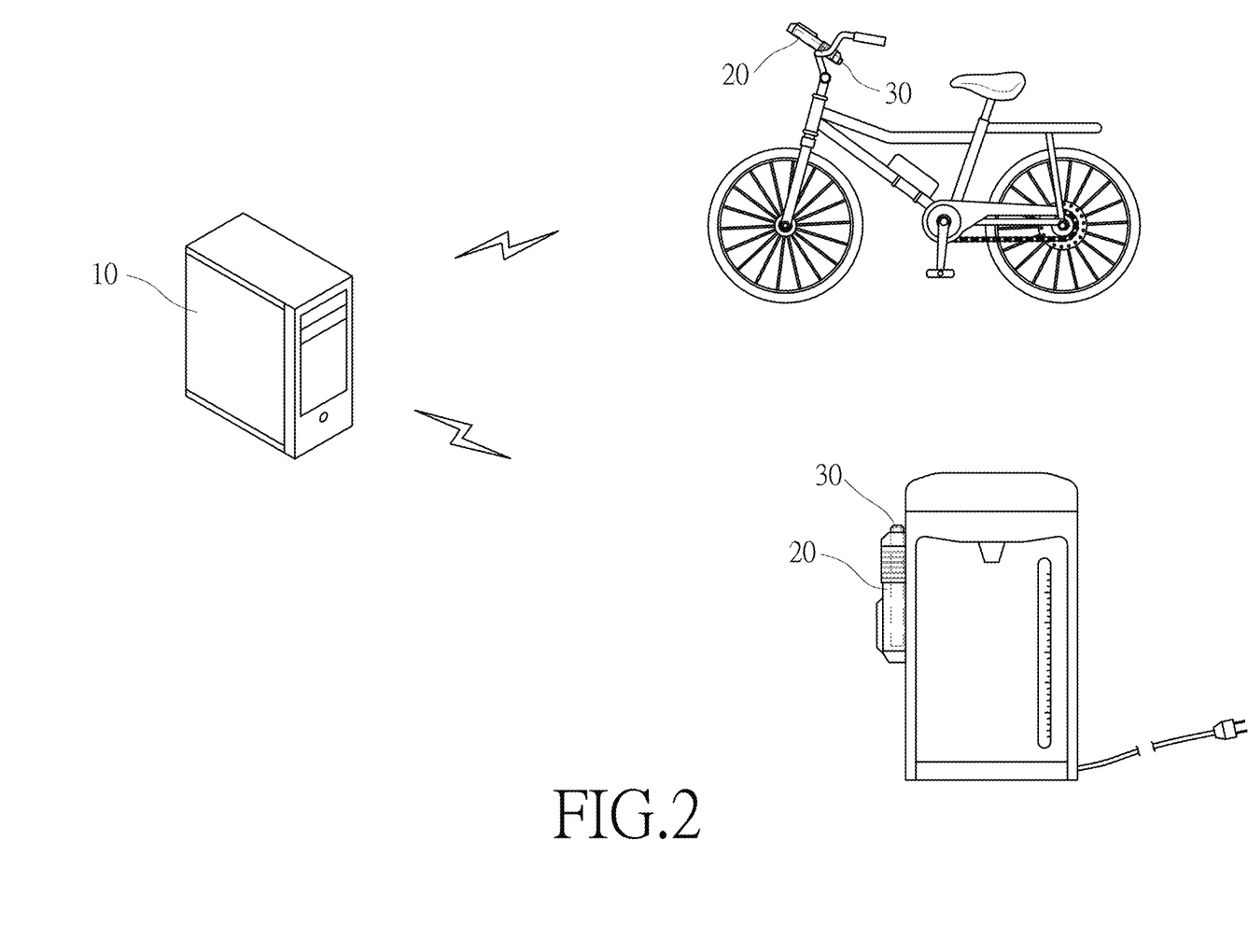
FIG. 2 is a schematic view showing a practical application of the carbon coin trading system according to the present invention.

The present invention provides a carbon coin trading system, of which primary architecture is shown in FIGS. 1 and 2. The system comprises at least one trading management host device 10 that serves as a trading platform, at least one authentication device 20 that detects an energy consumption state of a piece of equipment, and at least one physical carbon coin 30 with which an individual member perform calculation of carbon emission, wherein each authentication device 20 is connected to various types of equipment, such as an electrical bicycle, an electrical motorcycle, an electrical four-wheeled vehicle or non-electrically-driven mobile carriers, a mower, an electrical tool, a coffee machine, an electrical fan, or a vacuum cleaner or non-electrically-driven machinery or equipment, and allows the physical carbon coin 30 to connect to each authentication device 20 in performance of calculation of carbon emission, and makes connection, in a wireless or wired form, with the trading management host device 10 for mutual transmission of data to carry out at least one carbon coin trading event.

Concerning a detailed arrangement of the carbon coin trading system according to the present invention, as shown in FIGS. 1 and 2, the trading management host device 10 at least comprises a first processing unit 11, a memory unit 12, a communication unit 13, an individual membership management module 14, a declaration calculation module 15, and a trading event management module 16, wherein the first processing unit 11 is operable to execute built-in programs and to process all sorts of data; the memory unit 12 is connected to the first processing unit 11 and is operable to store programs and all sorts of data; the communication unit 13 is connected to the first processing unit 11 and is operable to allow the trading management host device 10 to establish connection with the authentication device 20 and the physical carbon coin 30 for receiving and transmitting each instruction and data, and the communication unit 13 may be wireless or wired connection technology, such as a Wi-Fi module, a Bluetooth module, a near field communication (NFC) module, or an Ethernet Module, or a combination of at least two thereof; the individual membership management module 14 is storable in the memory unit 12, and the individual membership management module 14 is operable to create and verify data of individual members, stores equipment in an individual member account and data management of a valuable digital token, and inquiry of data of individual members, such as use record of valuable digital token, trading record, and remaining amount; the declaration calculation module 15 is storable in the memory unit 12, and the declaration calculation module 15 is operable to create and ask a question of declaration to a trader and to proceed with calculation of a second carbon emission according to an answer of declaration from the trader to further calculate a valuable digital token that the trader may be granted for storage in the memory unit 12; the trading event management module 16 may be a program built in the memory unit 12 and is operable in connection with the individual membership management module 14 and the declaration calculation module 15, and is connectable to the authentication device 20 and the physical carbon coin 30 to execute and generate a carbon coin trading event, each carbon coin trading event including, but not limited to, trading counterparty and conversion, paying, transfer, and trading record of valuable digital token.

The authentication device 20 is mountable to a piece of equipment, and the equipment can be an electrical bicycle, an electrical motorcycle, an electrical four-wheeled vehicle or non-electrically-driven mobile carriers, a mower, an electrical tool, a coffee machine, an electrical fan, or a vacuum cleaner or non-electrically-driven machinery or equipment, and the authentication device 20 at least comprises a second processing unit 21, a memory unit 22, a communication unit 23, a detection module 25, and an electricity exchange unit 26, wherein the second processing unit 21 is operable to execute built-in programs and to process all sorts of data; the memory unit 22 is connected to the second processing unit 21, and the memory unit 22 is operable to store programs and all sorts of data; the communication unit 23 is connected to the second processing unit 21 and is operable to allow the authentication device 20 to establish connection with the trading management host device 10 and the physical carbon coin 30 for receiving and transmitting each instruction and data, and the communication unit 23 may be wireless or wired connection technology, such as a Wi-Fi module, a Bluetooth module, a near field communication (NFC) module, or an Ethernet Module, or a combination of at least two thereof; and the detection module 25 is a detection element, such as a global positioning system (GPS) element, a torque detection element, a rotational speed detection element, a speed detection element, and an energy consumption detection element, which is connected to the equipment for detecting data of the equipment, such as a traveling distance, an output power, a motor rotational speed, a moving speed, and electrical power consumption. Further, according to some embodiments, the second processing unit 21 is further connectable with an electricity exchange unit 26, which is operable to carry out transfer of electricity with respect to the physical carbon coin 30, wherein the electricity exchange unit 26 comprises an electricity management unit 261 and at least one electricity connection port 262 and at least one electricity storage unit 263 connected to the electricity management unit 261, wherein the electricity management unit 261 is operable to control input and output of electricity into and out of each electricity storage unit 263 through each the electricity connection port 262.

Further, the physical carbon coin 30 at least comprises a third processing unit 31, a memory unit 32, a communication unit 33, and a carbon computation module 34, wherein the third processing unit 31 is operable to execute built-in programs and to process all sorts of data; the memory unit 32 is connected to the third processing unit 31 and is operable to store programs, the valuable digital token and all sorts of data; the communication unit 33 is connected to the third processing unit 31 and is operable to allow the physical carbon coin 30 to establish connection with the trading management host device 10 and the authentication device 20 for receiving and transmitting each instruction and data, and the communication unit 33 may be wireless or wired connection technology, such as a Wi-Fi module, a Bluetooth module, a near field communication (NFC) module, or an Ethernet Module, or a combination of at least two thereof; and the carbon computation module 34 is connected to the third processing unit 31, and the carbon computation module 34 is operable to conduct, according to data, such as GPS recording, a traveling distance, an output torque, a motor rotational speed, a moving speed, and power consumption, detected by the detection module 25 of the authentication device 20 provided on the equipment, calculation or computation of a first carbon emission to be stored in the memory unit 32. Further, according to some embodiments, the third processing unit 31 is further connected with a power accumulation unit 35, and the power accumulation unit 35 is operable to carry out electricity transfer with respect to the electricity exchange unit 26 of the authentication device 20, and the power accumulation unit 35 comprises an electricity management unit 351, at least one electricity connection port 352, and at least one electricity storage unit 353, wherein the electricity management unit 351 is operable to control input and output of electricity into and out of each electricity storage unit 353 through each electricity connection port 352, wherein electricity of the electricity storage unit 353 may be supplied from green electricity or external green energy facility, such as solar power generation and wind power generation, and the power accumulation unit 35 is connected to the third processing unit 31 to work with the carbon computation module 34 for calculation or computation of carbon emission.

Figure 3:
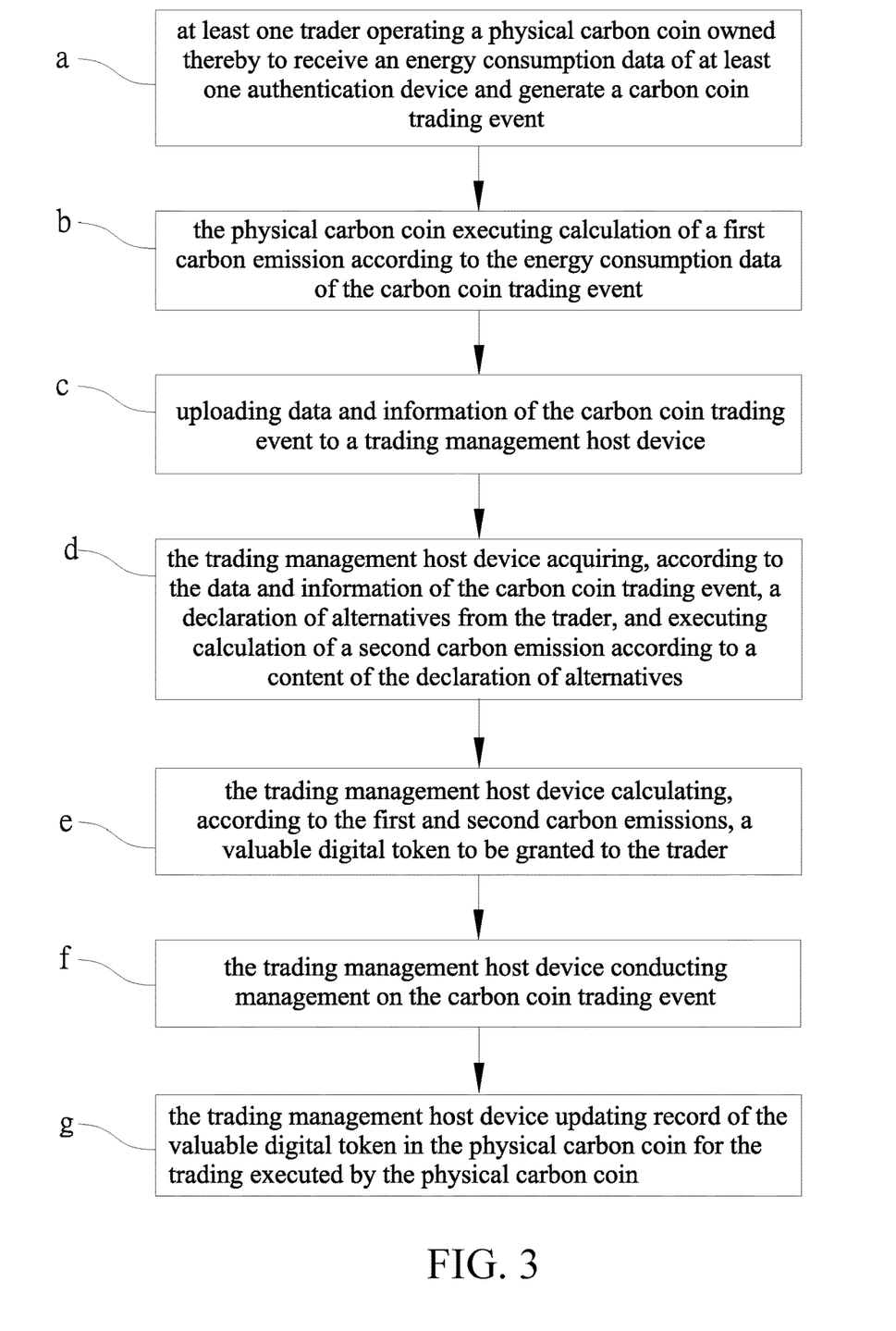
FIG. 3 is a flow chart showing a carbon coin trading method according to the present invention.

In a practical application of the present invention, as shown in FIGS. 1 and 2, the trading management host device 10 is operable to perform trading for a carbon reduction amount conducted by the physical carbon coin 30 of at least one individual member on at least one authentication device 20 so as to generate a carbon coin trading event and to effectively record, store, and statistically analyze, and manage data of carbon coin trading event information. A carbon coin trading method according to the present invention involves a flow shown in FIG. 3, of which steps comprise:

(a) at least one trader operating a physical carbon coin owned thereby to receive an energy consumption data of at least one authentication device and generate a carbon coin trading event;

(b) the physical carbon coin executing calculation of a first carbon emission according to the energy consumption data of the carbon coin trading event;

(c) uploading data and information of the carbon coin trading event to a trading management host device;

(d) the trading management host device acquiring, according to the data and information of the carbon coin trading event, a declaration of alternatives from the trader, and executing calculation of a second carbon emission according to a content of the declaration of alternatives;

(e) the trading management host device calculating, according to the first and second carbon emissions, a valuable digital token to be granted to the trader;

(f) the trading management host device conducting management on the carbon coin trading event, and (g) the trading management host device updating record of the valuable digital token in the physical carbon coin for the trading executed by the physical carbon coin.

A process of practically implementing the present invention can be better understood from the following embodiments, such as:

Embodiment 1: Carbon Coin Trading of Vehicle
(Such as Electrical Motorcycle or Assisted Bicycle)

Figure 4:
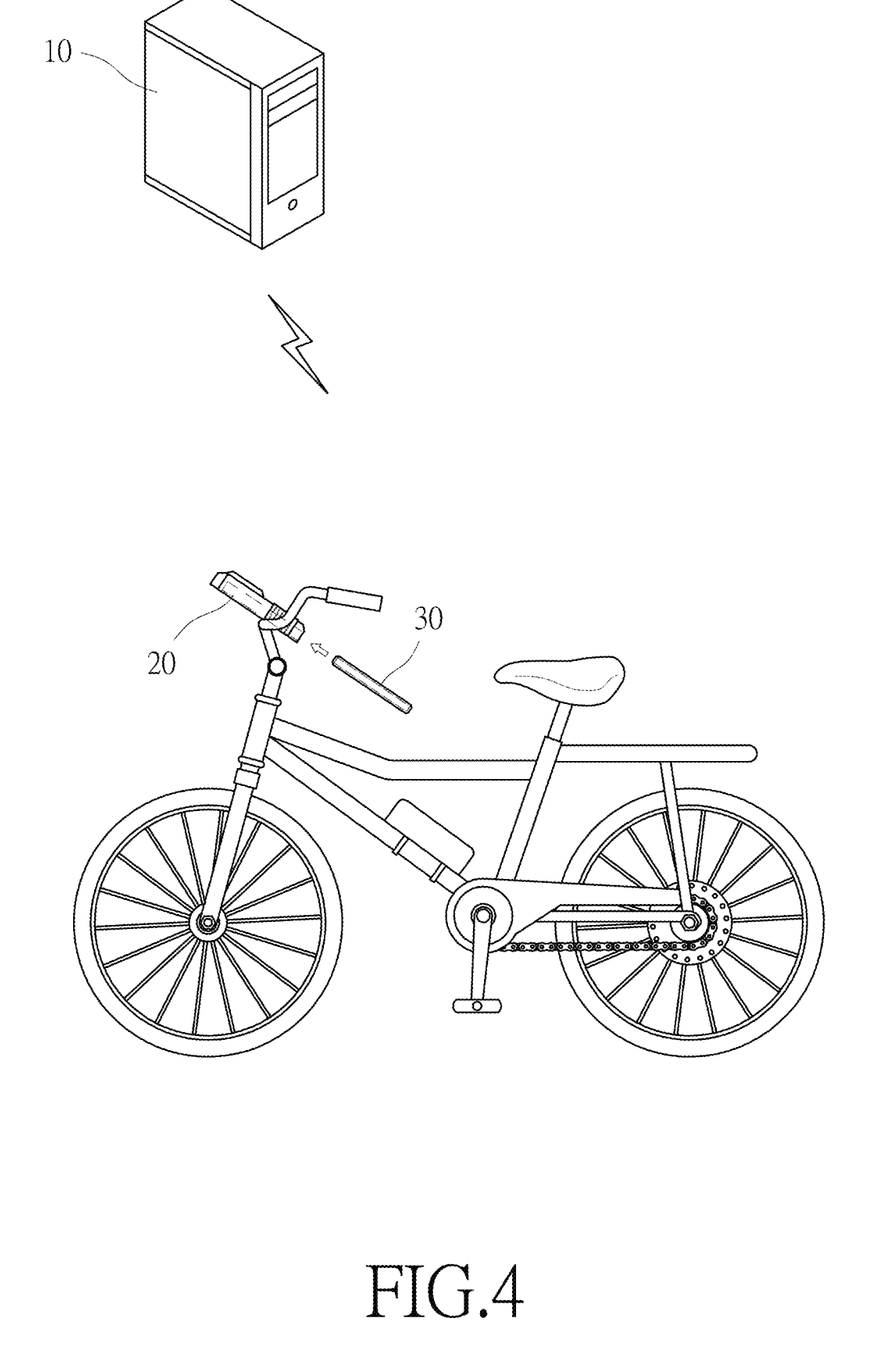
FIG. 4 is a schematic view showing an arrangement the present invention practically applied to a vehicle-related embodiment.
Figure 5:
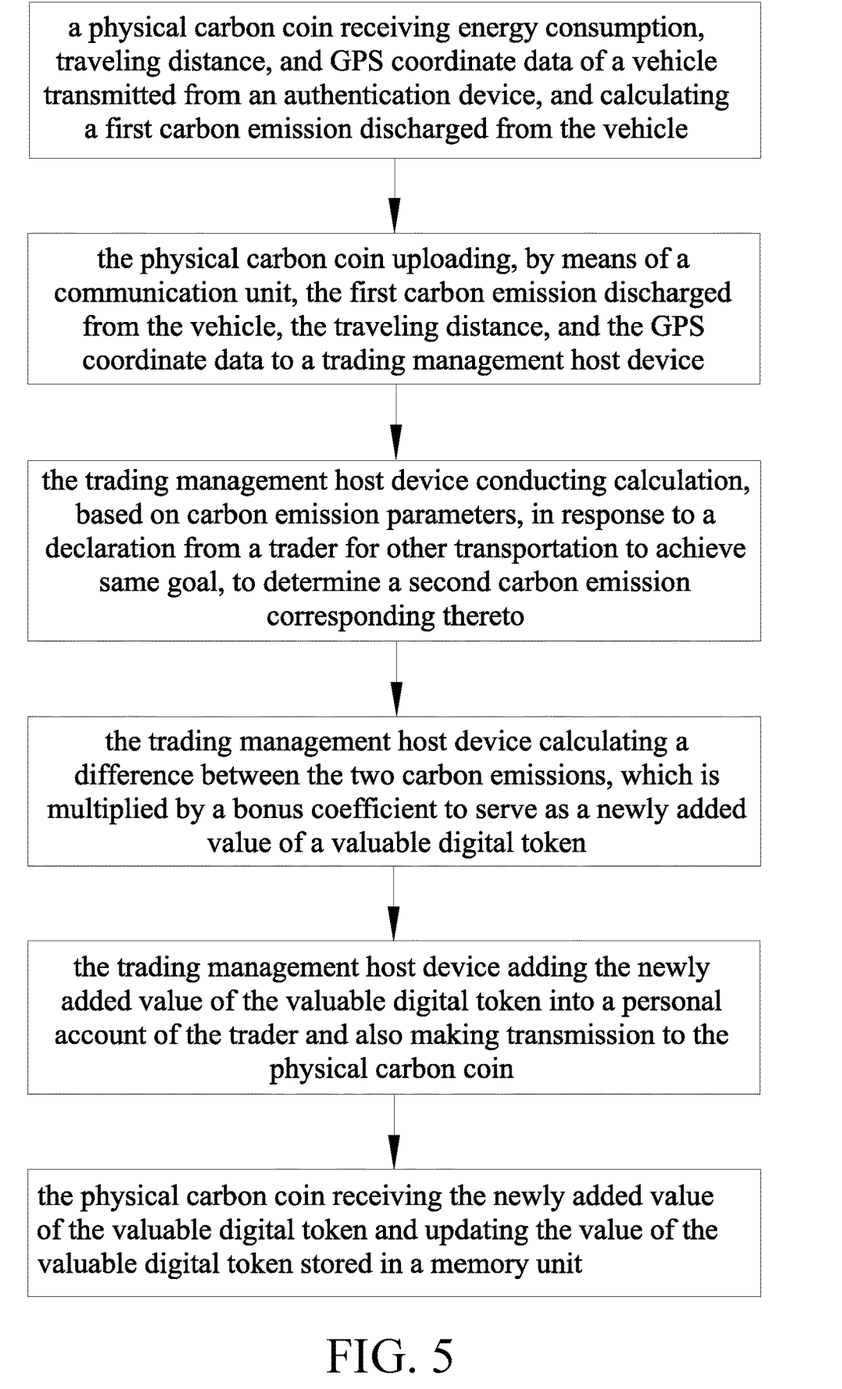
FIG. 5 is a flow chart demonstrating the practical application of the present invention in the vehicle-related embodiment.

As shown in FIGS. 4 and 5, a vehicle on which implementation is carried out is provided with an authentication device 20 for connection with a physical carbon coin 30 of an individual member, and the authentication device 20 or the physical carbon coin 30 is further in mutual communication with the trading management host device 10 for transmission of instructions and data and information. To operate, firstly, when the vehicle is started to advance, the authentication device 20 detects, by means of a detection element of the detection module 25, such as a GPS element, a torque detection element, a rotational speed detection element, a speed detection element, and an energy consumption detection element, energy consumption data of the vehicle after this round of operation, including, but not limited to, a traveling distance, an output power, a motor rotational speed, a moving speed, and electrical power consumption, and further, the physical carbon coin 30 makes mutual connection with the authentication device 20 by means of the communication units 33, 23, and receives the energy consumption data and generates a carbon coin trading event; next, the physical carbon coin 30, upon receiving the energy consumption data, carries out calculation or computation of a first carbon emission for this round of operation of the vehicle by means of the carbon computation module 34 of the physical carbon coin 30; then, the physical carbon coin 30 may, by itself or by means of the authentication device 20, upload the carbon coin trading event that includes the energy consumption data of the first carbon emission to the trading management host device 10; and next, the declaration calculation module 15 of the trading management host device 10, according to the data and information of the uploaded carbon coin trading event, issues, to a trader of the vehicle, an inquiry for a declaration of alternatives including, but not limited to, alternative solutions for a traveling schedule of the trader, and calculates a second carbon emission according to data and information of published standard carbon emission parameters; and next, the declaration calculation module 15 of the trading management host device 10 conducts calculation or computation, according to a difference between the first and second carbon emissions, in combination with other predetermined reference data, such as bonus coefficient, for a valuable digital token that the trader may be granted; and further next, the trading management host device 10 records the valuable digital token in the carbon coin trading event and update related records of the individual membership management module 14 and the trading event management module 16 for subsequent operations of management; and finally, the trading management host device 10 downloads data of the valuable digital token to the physical carbon coin 30 of the trader for updating, so that the trader may use the valuable digital token in the physical carbon coin 30 to conduct a value based transaction and thus completing the entire carbon coin trading.

According to some embodiments, the physical carbon coin 30 is further provided a power accumulation unit 35, and electricity stored in an electricity storage unit 353 of the power accumulation unit 35 may be supplied from green electricity or external green energy facility to allow the physical carbon coin 30 to supply, by way of the authentication device 20, the green electricity to the vehicle to thereby further reduce the first carbon emission for further increasing the valuable digital token that the trader be granted.

Embodiment 2: Carbon Coin Trading of Equipment
(Such as Electrically-Driven Equipment or Power Equipment)

Figure 6:
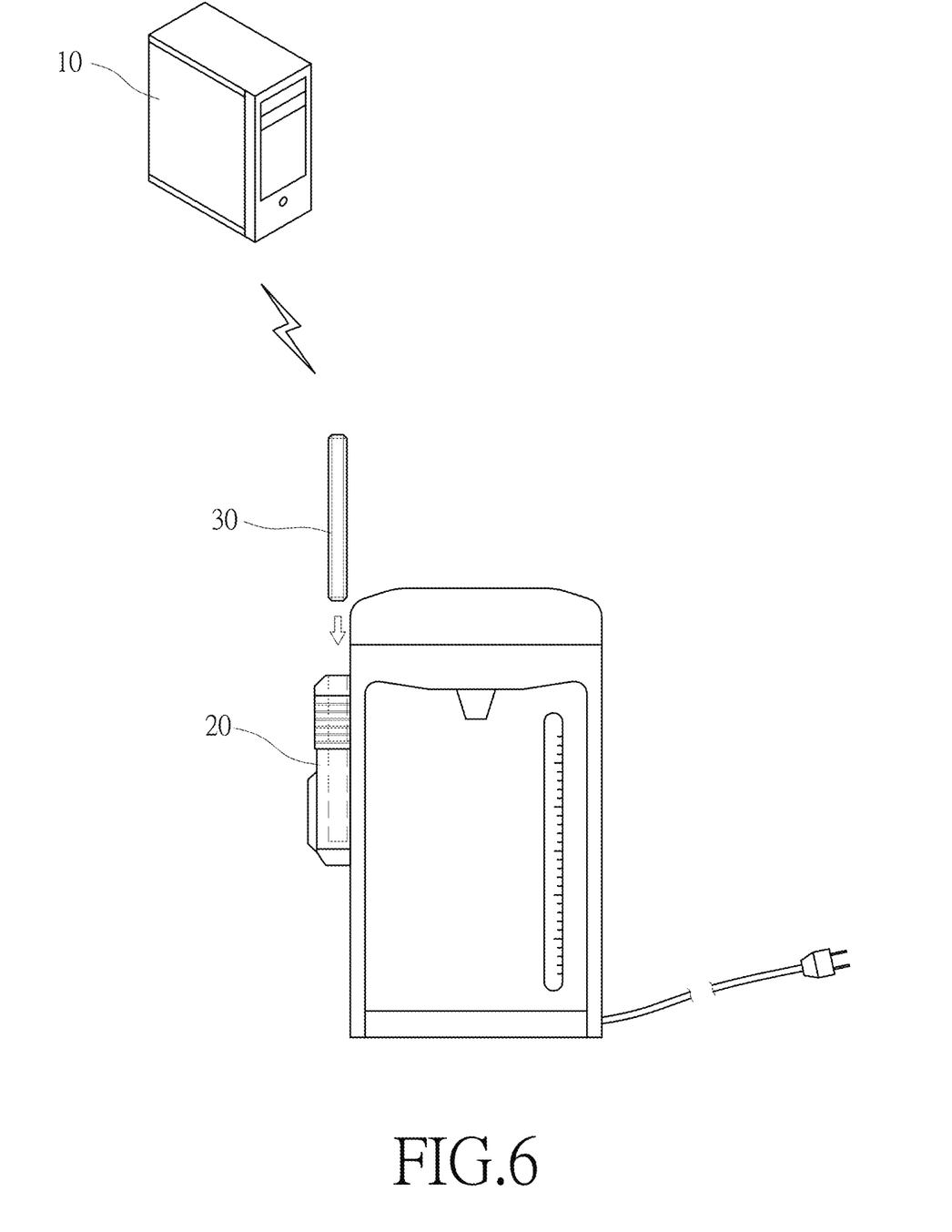
FIG. 6 is a schematic view showing an arrangement the present invention practically applied to an equipment-related embodiment.
Figure 7:
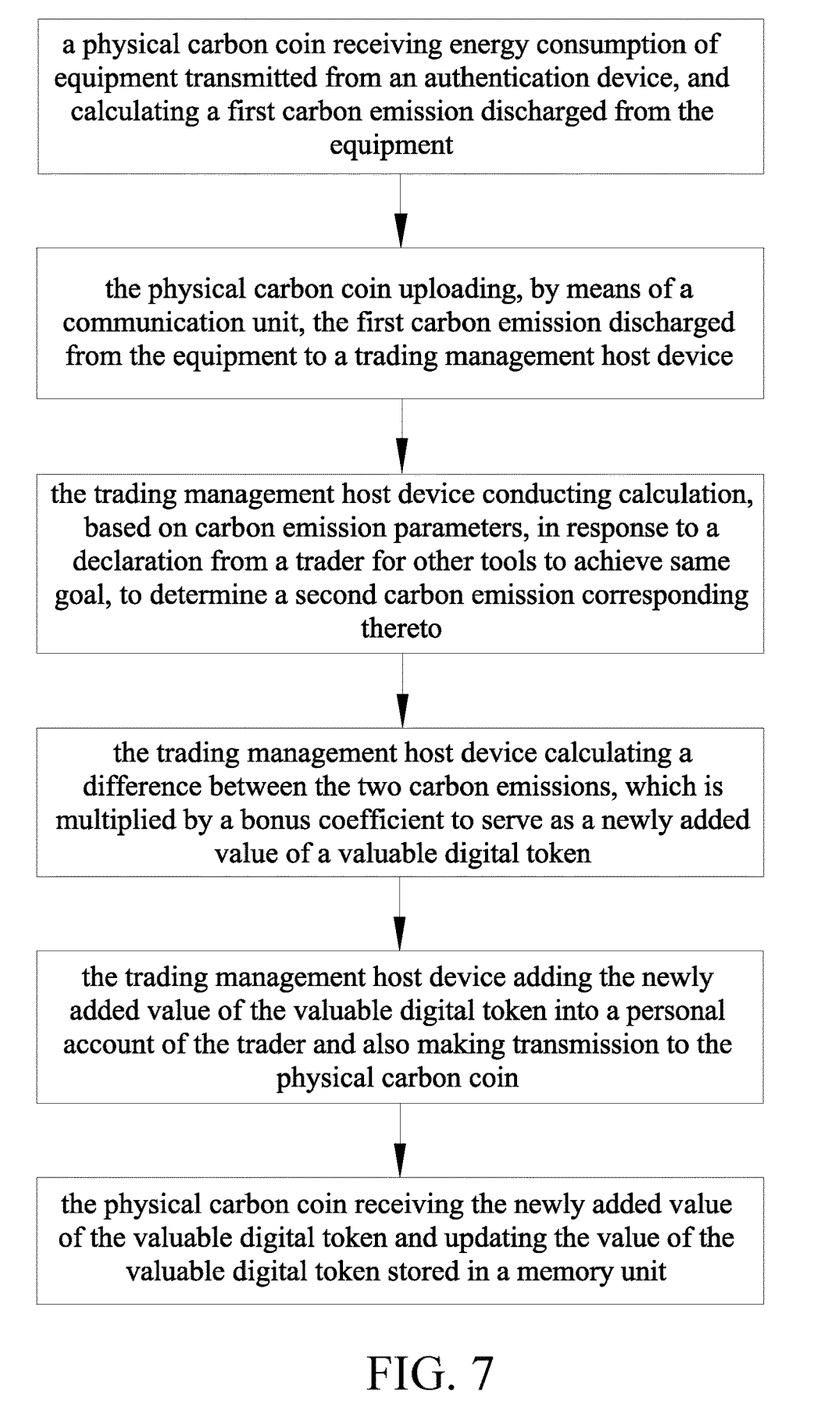
FIG. 7 is a flow chart demonstrating the practical application of the present invention in the equipment-related embodiment.

As shown in FIGS. 6 and 7, in an application to a piece of equipment, such as a water boiling flask, a power source of the equipment is connected with an authentication device 20 so that a physical carbon coin 30 of an individual member is connectable to the authentication device 20, and the authentication device 20 or the physical carbon coin 30 may be further in mutual communication with the trading management host device 10 for transmission of instructions and data and information. To operate, firstly, when the equipment is activated for heating, the authentication device 20 may detect, by means of a detection element, which can be an energy consumption detection element of the detection module 25, energy consumption data of the equipment, including, but not limited to, electricity consumed for this round of heating performed by the equipment, and further, the physical carbon coin 30 makes mutual connection with the authentication device 20 by means of the communication units 33, 23, and receives the energy consumption data and generates a carbon coin trading event; next, the physical carbon coin 30, upon receiving the energy consumption data, carries out calculation or computation of a first carbon emission of this round of heating performed by the equipment by means of the carbon computation module 34 of the physical carbon coin 30; then, the physical carbon coin 30 may, by itself or by means of the authentication device 20, upload the carbon coin trading event that includes the energy consumption data of the first carbon emission to the trading management host device 10; and next, the declaration calculation module 15 of the trading management host device 10, according to the data and information of the uploaded carbon coin trading event, issues, to a trader of the equipment, inquiry for a declaration of alternatives including, but not limited to, other alternative solutions of heating performable by the equipment of the trader, and calculates a second carbon emission according to data and information of published standard carbon emission parameters; and next, the declaration calculation module 15 of the trading management host device 10 conducts calculation or computation, according to a difference between the first and second carbon emissions, in combination with other predetermined reference data, such as bonus coefficient, for a valuable digital token that the trader may be granted; and further next, the trading management host device 10 records the valuable digital token in the carbon coin trading event and update related records of the individual membership management module 14 and the trading event management module 16 for subsequent operations of management; and finally, the trading management host device 10 downloads data of the valuable digital token to the physical carbon coin 30 of the trader for updating, so that the trader may use the valuable digital token in the physical carbon coin 30 to conduct a value based transaction and thus completing the entire carbon coin trading.

According to some embodiments, the physical carbon coin 30 is further provided a power accumulation unit 35, and electricity stored in an electricity storage unit 353 of the power accumulation unit 35 may green electricity or from external green energy facility to allow the physical carbon coin 30 to supply, by way of the authentication device 20, the green electricity to the vehicle to thereby further reduce the first carbon emission for further increasing the valuable digital token that the trader be granted.

It is readily appreciated from the above description that the carbon coin trading system and method thereof according to the present invention allow carbon coin trading to be conducted among small entities of small businesses and individual so as to encourage the small entities to join carbon reduction and enjoy the benefit of carbon reduction, and provide incentives to the small entities for achieving the goal of reducing emission of greenhouse gases efficiently and effectively, and the total carbon emission can be effectively controlled through the operation of market mechanism to thereby create economic value and improve additional value of products.

I claim:

1. A carbon coin trading system, comprising:
    at least one authentication device, which is a piece of equipment that consumes energy to operate and at least comprises a second processing unit, a memory unit, a communication unit, and a detection module that is operable to detect the energy consumption data of the equipment;
    at least one physical carbon coin, which makes connection with the authentication device for data transmission, the physical carbon coin at least comprising a third processing unit, a memory unit, a communication unit, and a carbon computation module; and
    a trading management host device, which makes connection with the authentication device and the physical carbon coin for data transmission, the trading management host device at least comprising a first processing unit, a memory unit, a communication unit, an individual membership management module, a declaration calculation module, and a trading event management module;
    wherein the detection module of the authentication device detects the energy consumption data of the equipment and the carbon computation module of the physical carbon coin calculates a first carbon emission according to the energy consumption data of the equipment for uploading to the trading management host device, and the trading management host device acquires, by means of the declaration calculation module, a declaration of alternatives, so that the declaration calculation module is operable to calculate a second carbon emission according to the declaration of alternatives and to further calculate a grantable valuable digital token and generating and recording a carbon coin trading event, wherein the authentication device connected to the equipment that consumes energy is operated with the second processing unit to provide the energy consumption data to further provide the first carbon emission, which is used for further operation with the trading management host device operated with the first processing unit to provide the second carbon emission according to the declaration of alternatives, in order to provide the grantable valuable digital token according to the first and second carbon emissions; and wherein the trading system comprises a method which at least comprises (a) at least one trader operating a physical carbon coin owned thereby to receive an energy consumption data of at least one authentication device and generate a carbon coin trading event; (b) the physical carbon coin executing calculation of a first carbon emission according to the energy consumption data of the carbon coin trading event; (c) uploading data and information of the carbon coin trading event to a trading management host device; (d) the trading management host device acquiring, according to the data and information of the carbon coin trading event, a declaration of alternatives from the trader, and executing calculation of a second carbon emission according to a content of the declaration of alternatives; (e) the trading management host device calculating, according to the first and second carbon emissions, a valuable digital token to be granted to the trader; (f) the trading management host device conducting management on the carbon coin trading event, and (g) the trading management host device updating record of the valuable digital token in the physical carbon coin for the trading executed by the physical carbon coin.

2. The carbon coin trading system according to claim 1, wherein the second processing unit of the authentication device is further in connection with an electricity exchange unit, and the third processing unit of the physical carbon coin is provided with a power accumulation unit for corresponding connection therewith, so as to allow the authentication device and the physical carbon coin to conduct electricity transfer therebetween.

3. The carbon coin trading system according to claim 2, wherein the electricity exchange unit comprises an electricity management unit and at least one electricity connection port and at least one electricity storage unit connected to the electricity management unit.

4. The carbon coin trading system according to claim 2, wherein the power accumulation unit comprises an electricity management unit and at least one electricity connection port and at least one electricity storage unit connected to the electricity management unit.

5. The carbon coin trading system according to claim 4, wherein electricity of the electricity storage unit is supplied from green electricity or external green energy facility.

* * * * *